US011199464B2

(12) United States Patent
Nutter et al.

(10) Patent No.: US 11,199,464 B2
(45) Date of Patent: Dec. 14, 2021

(54) PRESSURE DIFFERENTIAL SENSOR APPARATUS WITH HIGH-VISIBILITY CONDITION INDICATOR

(71) Applicant: Setra Systems, Inc., Boxborough, MA (US)

(72) Inventors: Fran Nutter, Charlton, MA (US); G. Michael Soper, Scarborough, MA (US); Justin DeSilva, Mendon, MA (US); Sunil Barot, Nashua, NH (US)

(73) Assignee: SETRA SYSTEMS, INC., Boxborough, MA (US)

( * ) Notice: Subject to any disclaimer, the term of this patent is extended or adjusted under 35 U.S.C. 154(b) by 132 days.

(21) Appl. No.: 16/738,245

(22) Filed: Jan. 9, 2020

(65) Prior Publication Data

US 2021/0215563 A1 Jul. 15, 2021

(51) Int. Cl.
*G01L 19/12* (2006.01)
*G01L 13/00* (2006.01)

(52) U.S. Cl.
CPC .............. *G01L 19/12* (2013.01); *G01L 13/00* (2013.01)

(58) Field of Classification Search
CPC ..... G01L 19/147; G01L 9/0042; G01L 19/04; G01L 9/0054; G01L 9/0072; G01L 13/025; G01L 19/14; G01L 19/0038; G01L 19/0084; G01L 9/0055; G01L 9/0075; G01L 19/0069; G01L 9/0052; G01L 9/0073; G01L 19/0092; G01L 19/0618;

(Continued)

(56) References Cited

U.S. PATENT DOCUMENTS 4,777,827 A * 10/1988 Brodetsky ............. G01L 9/0029
336/30
5,945,591 A * 8/1999 Saarem ................ G01F 25/0007
73/1.35

(Continued)

FOREIGN PATENT DOCUMENTS

CN 203100965 U * 7/2013
CN 104337506 A * 2/2015

(Continued)

OTHER PUBLICATIONS

"Room Pressure Monitors," Web page <https://www.setra.com/product/room-pressure-monitors>, 4 pages, Nov. 7, 2019, retrieved from Internet Archive Wayback Machine <https://web.archive.org/web/20191107221414/https:/www.setra.com/product/room-pressure-monitors> on Sep. 14, 2021.

(Continued)

*Primary Examiner* — Andre J Allen
(74) *Attorney, Agent, or Firm* — Moreno IP Law LLC

(57) ABSTRACT

An apparatus, having: a pressure differential sensor apparatus (100) configured to detect a pressure difference between two locations; a faceplate (102) having a base (104) and a protrusion (106) from the base, the protrusion comprising a light-transmissive perimeter (116) configured to transmit light forward and laterally; and a circuit board (400) having an indicator light (402) mounted thereon and configured to emit light into the light-transmissive perimeter, the indicator light further configured to emit a first color under first pressure difference conditions and a second color under second pressure difference conditions.

20 Claims, 4 Drawing Sheets

(58) Field of Classification Search
CPC . G01L 19/0645; G01L 19/143; G01L 9/0051; G01L 19/0007; G01L 19/0046; G01L 19/06; G01L 19/0627; G01L 19/0681; G01L 27/002; G01L 9/00; G01L 9/0041; G01L 9/0044; G01L 11/025; G01L 11/04; G01L 19/0023; G01L 19/0672; G01L 19/069; G01L 19/142; G01L 19/145; G01L 19/16; G01L 7/00; G01L 9/0047; G01L 9/06; G01L 9/065; G01L 9/12; G01L 11/02; G01L 13/00; G01L 15/00; G01L 19/0015; G01L 19/003; G01L 19/02; G01L 19/0609; G01L 19/083; G01L 19/10; G01L 19/148; G01L 27/005; G01L 7/08; G01L 7/082; G01L 7/163; G01L 7/166; G01L 9/0045; G01L 9/0048; G01L 9/006; G01L 9/007; G01L 9/0076; G01L 9/04; G01L 9/045; G01L 9/125; G01L 11/00; G01L 17/00; G01L 19/00; G01L 19/0076; G01L 19/08; G01L 19/141; G01L 19/146; G01L 1/142; G01L 1/2262; G01L 1/246; G01L 21/12; G01L 23/16; G01L 27/007; G01L 7/04; G01L 7/063; G01L 7/084; G01L 7/086; G01L 7/16; G01L 9/0002; G01L 9/0007; G01L 9/0016; G01L 9/0019; G01L 9/0022; G01L 9/0027; G01L 9/0033; G01L 9/0039; G01L 9/005; G01L 9/0058; G01L 9/0077; G01L 9/0079; G01L 9/008; G01L 9/0092; G01L 9/0095; G01L 9/025; G01L 9/08; G01L 9/085; G01L 9/105; G01L 9/14; G01L 9/16; H01L 2224/48091; H01L 2924/00014; H01L 2224/48137; H01L 2224/48145; H01L 2224/73265; H01L 2924/00012; H01L 2224/04105; H01L 2224/24137; H01L 2224/49175; H01L 24/19; H01L 2924/1461; H01L 2924/1815; H01L 2924/18162; H01L 29/84; H01L 41/047; H01L 41/0475; H01L 41/1132
USPC .................................................... 73/700–756
See application file for complete search history.

(56) References Cited

U.S. PATENT DOCUMENTS

| | | | | |
|---|---|---|---|---|
| 2004/0113813 | A1* | 6/2004 | Henson | G01L 7/045 340/870.07 |
| 2006/0022214 | A1* | 2/2006 | Morgan | H05B 45/3725 257/99 |
| 2014/0197960 | A1 | 7/2014 | Taylor et al. | |
| 2015/0101412 | A1* | 4/2015 | Poli | G04G 21/02 73/714 |
| 2016/0282113 | A1* | 9/2016 | Lee | G04G 21/02 |

FOREIGN PATENT DOCUMENTS

| | | | |
|---|---|---|---|
| CN | 107941414 A | * | 4/2018 |
| JP | 11237293 A | * | 8/1999 |

OTHER PUBLICATIONS

"Setra FLEX™ Room Environmental Monitor," Web page <https://www.setra.com/setra-flex>, 6 pages, Nov. 7, 2019, retrieved from Internet Archive Wayback Machine <https://web.archive.org/web/20191107220849/https://www.setra.com/setra-flex> on Sep. 14, 2021.

"Setra Lite™ Visual Room Pressure Indicator," Web page <https://www.setra.com/product/room-pressure-monitors/setra-lite>, 5 pages, Nov. 7, 2019, retrieved from Internet Archive Wayback Machine <https://web.archive.org/web/20191107220942/https://www.setra.com/product/room-pressure-monitors/setra-lite> on Sep. 14, 2021.

"Model SRPM Room Pressure Monitor," Web page <https://www.setra.com/product/room-pressure-monitors/model-srpm>, 4 pages, Nov. 7, 2019, retrieved from Internet Archive Wayback Machine <https://web.archive.org/web/20200923101828/https://www.setra.com/product/room-pressure-monitors/model-srpm> on Sep. 14, 2021.

"Hot-Wire to Setra FLEX™ Conversion Kit," Web page <https://www.setra.com/product/room-pressure-monitoring/hot-wire-replacement-kit>, 5 pages, Nov. 7, 2019, retrieved from Internet Archive Wayback Machine <https://web.archive.org/web/20200924012720/https://www.setra.com/product/room-pressure-monitoring/hot-wire-replacement-kit> on Sep. 14, 2021.

"Model SRCM," Web page <https://www.setra.com/product/room-pressure-monitoring/model-srcm>, 4 pages, Nov. 7, 2019, retrieved from Internet Archive Wayback Machine <https://web.archive.org/web/20200809234301/https://www.setra.com/product/room-pressure-monitoring/model-srcm> on Sep. 14, 2021.

"Model MRMS," Web page <https://www.setra.com/product/room-pressure-monitoring/model-mrms>, 4 pages, Nov. 7, 2019, retrieved from Internet Archive Wayback Machine <https://web.archive.org/web/20200810002318/https://www.setra.com/product/room-pressure-monitoring/model-mrms> on Sep. 14, 2021.

"Model SRIM2," Web page <https://www.setra.com/product/room-pressure-monitoring/model-srim2>, 4 pages, Nov. 7, 2019, retrieved from Internet Archive Wayback Machine <https://web.archive.org/web/20200919132305/https://www.setra.com/product/room-pressure-monitoring/model-srim2> on Sep. 14, 2021.

"Model SRIM1," Web page <https://www.setra.com/product/room-pressure-monitoring/model-srim1>, 4 pages, Nov. 7, 2019, retrieved from Internet Archive Wayback Machine <https://web.archive.org/web/20200924011801/https://www.setra.com/product/room-pressure-monitoring/model-srim1> on Sep. 14, 2021.

"Model SRIMV," Web page <https://www.setra.com/product/room-pressure-monitoring/model-srimv>, 4 pages, Nov. 7, 2019, retrieved from Internet Archive Wayback Machine <https://web.archive.org/web/20200813123302/https://www.setra.com/product/room-pressure-monitoring/model-srimv> on Sep. 14, 2021.

"Model SRMD Room Monitor Display," Web page <https://www.setra.com/product/room-pressure-monitoring/model-srmd>, 4 pages, Nov. 7, 2019, retrieved from Internet Archive Wayback Machine <https://web.archive.org/web/20200810001200/https://www.setra.com/product/room-pressure-monitoring/model-srmd> on Sep. 14, 2021.

* cited by examiner

PRESSURE DIFFERENTIAL SENSOR APPARATUS WITH HIGH-VISIBILITY CONDITION INDICATOR

FIELD OF THE INVENTION

The present apparatus relates generally to a pressure differential sensor apparatus that provides a highly visible assessment of a pressure difference.

BACKGROUND OF THE INVENTION

There exist in the market today several critical workspaces that require their environment to be monitored. These spaces include, for example, patient isolation rooms, operating rooms, wet labs, and pharmaceutical manufacturing spaces etc. The environmental conditions being monitored include, but are not limited to, differential air pressure relative to adjacent or nearby spaces, temperature, humidity, and gas level (O2, CO, CO2). Differential air pressure can be monitored to ensure an environment remains in a positive pressure condition or a negative pressure condition. Particularly as it relates to the healthcare market, regulations are being introduced and/or enforced that require additional spaces to be maintained in either a positive pressure or a negative pressure condition. Such additional spaces include sterilization rooms, clean and dirty linen storage rooms, etc.

A clean room may be required to operate in a positive pressure condition so that air flows from the room to the surrounding environment rather than from the surrounding environment into the room. This prevents contaminants entrained in the air in the surrounding environment from being drawn into the clean room. Oppositely, a dirty linen storage room may be required to operate in a negative pressure condition so that air flows into the room from the surrounding environment rather than out of the room to the surrounding environment. This prevents contaminants entrained in the room's air from flowing outside the dirty linen storage room and into the surrounding environment.

Presently, some of the spaces mentioned above are measured, monitored and alarmed using traditional room pressure monitors manufactured by Setra of Boxborough Mass. Example models include the SRPM, SRIM, SRCM and Flex. Other companies that manufacture pressure differential sensors include Critical Room Control (CRC), Triatek, Price, and TSI Inc. However, prior art units have a large physical size, relatively high cost, and a significant amount of setup, and several are not easy to install or maintain (e.g. calibration) over the long term. Consequently, there remains room in the art for improvement.

BRIEF DESCRIPTION OF THE DRAWINGS

The invention is explained in the following description in view of the drawings that show.

DETAILED DESCRIPTION OF THE INVENTION

Disclosed herein is an improved pressure differential sensor apparatus with a novel, high-visibility indicator that provides an assessment of whether the atmosphere within a space is being maintained within a desired differential pressure relative to another location. Advantageously, the high-visibility indicator is clearly visible from a far distance and from a wide viewing angle. Optionally, a pressure difference value can also be presented as well as an analog or digital output that is suitable for use with building automation and control systems. The pressure differential sensor apparatus is simple to install in all geographic locations and is very aesthetically pleasing.

A particular advantage of the pressure differential sensor apparatus described herein is that the pressure differential sensor apparatus can be configured to provide the minimum possible information needed to maintain room pressure requirements. For example, the pressure differential sensor apparatus provides a highly visible indicator to the incidental viewer that the space is within acceptable parameters merely by displaying a light of a particular color. The light may be of a geometric shape such as a ring. Also, the pressure differential sensor apparatus can display that the space is outside acceptable parameters merely by displaying a different color.

Another advantage is that the pressure differential sensor apparatus presents a low profile for high traffic areas and can be configured to present detailed data for a few seconds only if actuated by the user. Presenting detailed data only upon demand results in reduced visual clutter.

Still another advantage is that the pressure differential sensor apparatus can be installed into all minimum standard electrical boxes found globally.

Figure 1:
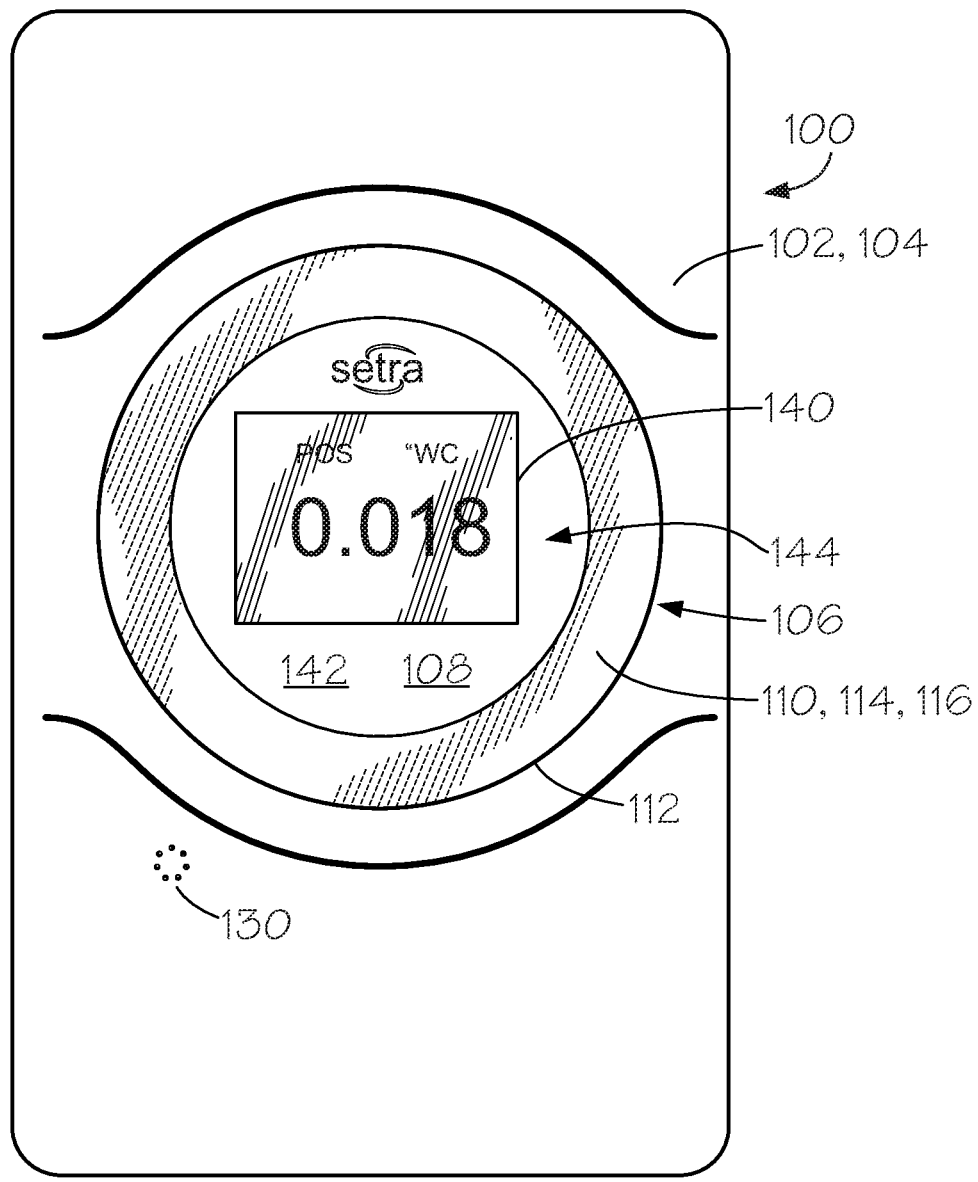
FIG. 1 is a front view of an example embodiment of a pressure differential sensor apparatus disclosed herein.

FIG. 1 shows a pressure differential sensor apparatus 100 configured to detect a pressure difference between two locations. A first location may be, for example, pressure present in an environment in front of the pressure differential sensor apparatus 100. If the pressure differential sensor apparatus 100 is mounted in a hallway, then the first location would be the hallway. A second location may be any location remote from the environment in front of the pressure differential sensor apparatus 100. For example, the second location may be a room that is separated from the hallway by a barrier such as a wall. The barrier may or may not be hermetically sealed. Typically, when the barrier is a wall, the wall will have a door, a window, and/or an opening through which air can pass. When air can pass across the barrier, the pressures on either side of the barrier will naturally seek to equalize despite institutional efforts to maintain a pressure differential. Hence, it is important to be able to monitor a condition of the pressure difference to ensure it remains within an acceptable range.

The pressure differential sensor apparatus 100 includes a faceplate 102 with a base 104 and a protrusion 106. The protrusion 106 includes a face 108 and a light-transmissive portion 110. In the example embodiment shown, the light-transmissive portion 110 is part of the face 108. The light-transmissive portion 110 is configured to transmit light forward (out of the page in FIG. 1) and laterally (parallel to the page in FIG. 1) through its side edge 112. The light-transmissive portion 110 acts as a visual indicator 114 that can be used to indicate a status of a pressure difference between the two locations. In the example embodiment shown, the light-transmissive portion 110 includes a translucent material around a light-transmissive perimeter 116 of the face 108. The pressure differential sensor apparatus 100 is configured such that visual indicator 114 emits at least two colors: a first color under first pressure difference conditions, and a second color under second pressure difference conditions. For example, when the actual pressure difference is within a range of pressure differences deemed acceptable, the visual indicator 114 emits a first color that may be green. When the actual pressure difference is outside of the range of pressure differences deemed acceptable, the visual indicator 114 emits a second color that may be red. Alternately, or in addition, there may be 3 or more colors, each associated with a different degree of relative concern related to the range of pressure differences deemed acceptable. For example, the visual indicator 114 may emit another color such as yellow between conditions deemed acceptable for green and red.

In an embodiment, the pressure differential sensor apparatus 100 can be put in standby mode. This may be suitable for times when the room will be open for an extended period of time, such as for cleaning etc. When in the standby mode, the visual indicator 114 may emit a color associated with the standby mode, such as yellow.

A front port 130 is disposed in this example embodiment on the base 104 of the faceplate 102. The front port 102 senses a pressure present at the faceplate 102. A rear port (not visible) is present elsewhere and can be connected to a tube that can terminate at any desired location. The rear port will sense a pressure present at a distal end of the connected tube. If the pressure differential sensor apparatus 100 is mounted in a hallway and the end of the tube is disposed in a room off the hallway, then the pressure differential sensor apparatus 100 will sense a pressure difference between the hallway and the room off the hallway.

Such an arrangement, coupled with the ability of the visual indicator 114 to emit light both forward and laterally, enables a viewer in a hallway to see the visual indicator 114 from virtually any distance and from any angle. This may be the only information provided without prompt from the viewer/user. Consequently, the pressure differential sensor apparatus 100 can be configured to provide an instant indication of the status of the pressure difference without additional visual clutter. In institutions where pressure differences must be monitored, often more than one pressure difference must be monitored. For example, often several rooms off a main hallway or hallways must be monitored simultaneously. In such a scenario, there may be a pressure differential sensor apparatus 100 for each room. The pressure differential sensor apparatus 100 disclosed herein provides advantage in this scenario because the observer would be able to see many, if not all of the pressure differential sensor apparatuses 100 at the same time. This is because each pressure differential sensor apparatus 100 can be seen from a variety of viewing angles. Hence, from one position the viewer could see many pressure differential sensor apparatuses 100 even though each pressure differential sensor apparatus 100 may be at a different viewing angle from the observer's position. As a result, the observer can view multiple pressure differential sensors 100 and instantly determine if any one or more is indicating that attention is needed. Moreover, due to the simple and intuitive nature of the visual indicator 114, the observer need not be a trained observe that is skilled in assessing data. Anyone capable of discerning between the colors can ascertain if the actual pressure difference is acceptable.

Alternately, or in addition, if there is a concern whether the observer can discern colors, the visual indicator 114 can instead indicate no light under first conditions and a steady light under second conditions. The reverse is also suitable. In an embodiment, the steady light could be red. Further, it is also possible to indicate via flashing the visual indicator 114 in various way to convey pertinent information regarding the condition of the pressure difference. For example, the light could not flash under first conditions and flash under second conditions. The reverse is also suitable. The rates of the flashing could increase as the pressure difference gets further from the range considered to be appropriate.

In an embodiment, the face 108 of the protrusion 106 is depressible and comprises a transparent portion 140. In an example embodiment, the face includes an opaque portion 142 between the transparent portion 140 and the light-transmissive portion 110.

The pressure differential sensor apparatus 100 may optionally include a display 144 disposed behind and aligned with the transparent portion 140 and positioned within the light-transmissive perimeter 116, and a display sensor (not visible) disposed behind the face 108 and configured to be depressed when the face 108 is pressed. The display 144 may be configured to change what is displayed on the display 144 in response to a depression of the face which, in turn, activates the display sensor. In an example embodiment, the display 144 defaults to displaying a blank screen or a logo or the like but will display data such as a pressure difference value once the display sensor is depressed by depressing the face 108. In the embodiment shown, the display 144 momentarily displays "POS" to indicate a positive pressure (pressure at the rear port is greater than pressure at the front port 130) is present. The display 144 also momentarily displays a pressure difference value, and ""WC" to indicate the units are Inches Water Column. The display can be configured to display (or not display) various data as desired. In an embodiment, after the momentary display of information, the display 144 reverts to the chosen default after a few seconds. Along with other settings, a length of the momentary display could be selected by the user. Alternately, the display 144 can be set to continuously display the selected data. In addition, in an embodiment the pressure differential sensor apparatus 100 can be put in standby mode by depressing the face 108 a predetermined number of times and taken out of the standby mode by depressing the face 108 a predetermined number of times. For example, pressing on the face 108 three times in rapid succession may cause the pressure differential sensor apparatus 100 to be put in standby mode, and pressing on the face 108 again three times in rapid succession may cause the pressure differential sensor apparatus 100 to be taken out of the standby mode.

Figure 2:
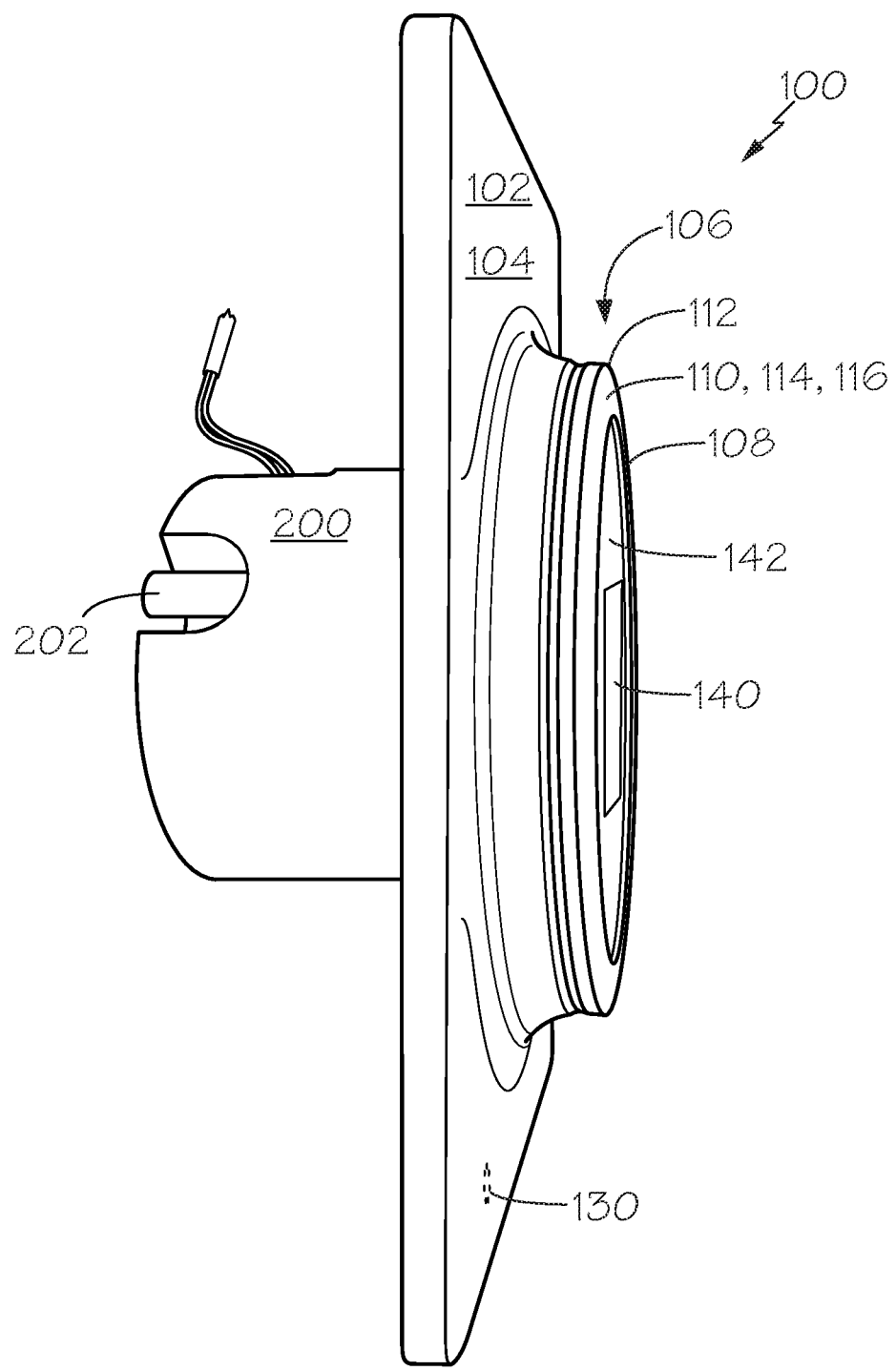
FIG. 2 is a side view of the pressure differential sensor apparatus of FIG. 1.

FIG. 2 is a side view of the pressure differential sensor apparatus 100 of FIG. 1. The protrusion 106 can be seen as well as the side edge 112 of the light-transmissive portion 110 that functions to transmit light laterally. Also visible is a housing 200 that houses components of the pressure differential sensor apparatus 100 as well as the rear port 202.

Figure 3:
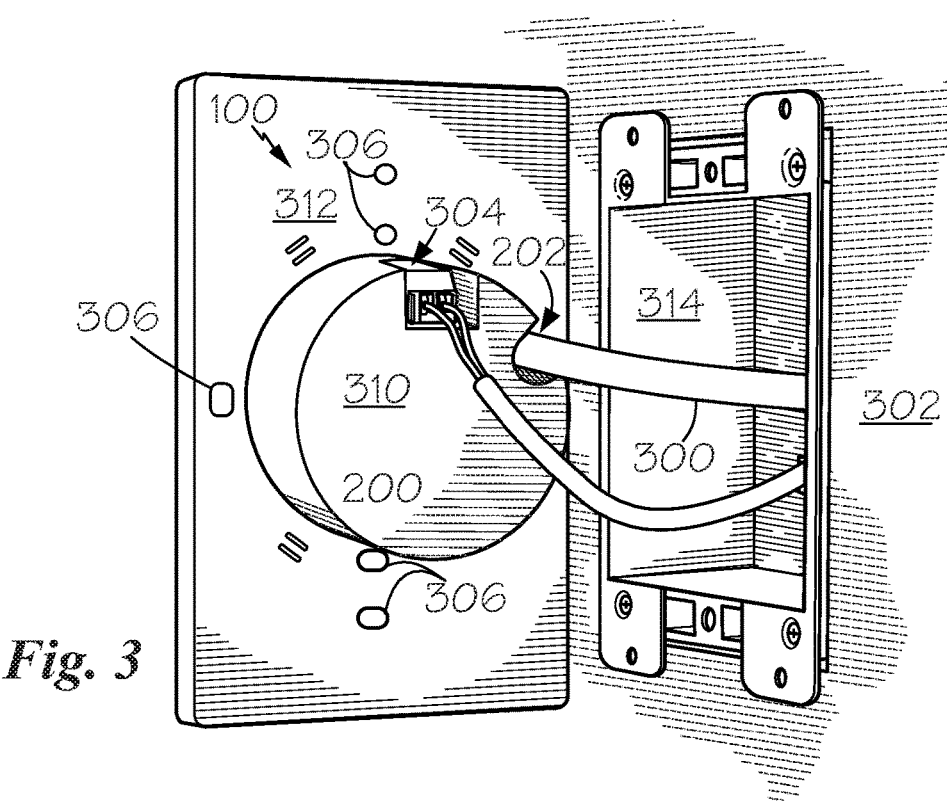
FIG. 3 is a rear view of the pressure differential sensor apparatus of FIG. 1.

FIG. 3 is a rear view of the pressure differential sensor apparatus 100 of FIG. 1 without the faceplate 102. A tube 300 is connected to the rear port and an opposite end (not shown) of the tube is disposed at a remote location such as a room (not shown) on the other side of a wall 302 on which the pressure differential sensor apparatus 100 is mounted. Connections 304 are present for power and/or communications. In the embodiment shown, the housing 200 includes a storage space 310 for components of the pressure differential sensor apparatus 100 and a back plate 312 to which the faceplate 102 secures.

The storage space 310 of the housing 200 of the pressure differential sensor apparatus 100 is sized to fit inside a standardized U.S. single gang box 314 as well as single gang boxes worldwide, including gang boxes in Europe and China. In an example embodiment, the housing 200 is 1¼" deep×2" tall and 2" wide. This makes it possible to fit within the standardized U.S. single gang box, whose inside dimensions are greater than this. (A U.S. single gang box may have the following dimensions: 2⅛" wide×3" H×3¼" deep.) The back plate 312 of the housing 200 of the pressure differential sensor apparatus 100 includes mounting holes 306 that can be used to secure the housing 200 to the single gang box 314. Alternately, mounting holes 306 in the back plate 312 can be used to mount the housing 200 directly to any surface. The faceplate 102 can then be mounted over the back plate 312. The faceplate 102 may optionally be sized to match standard sized faceplates for the single gang box 314.

Figure 4:
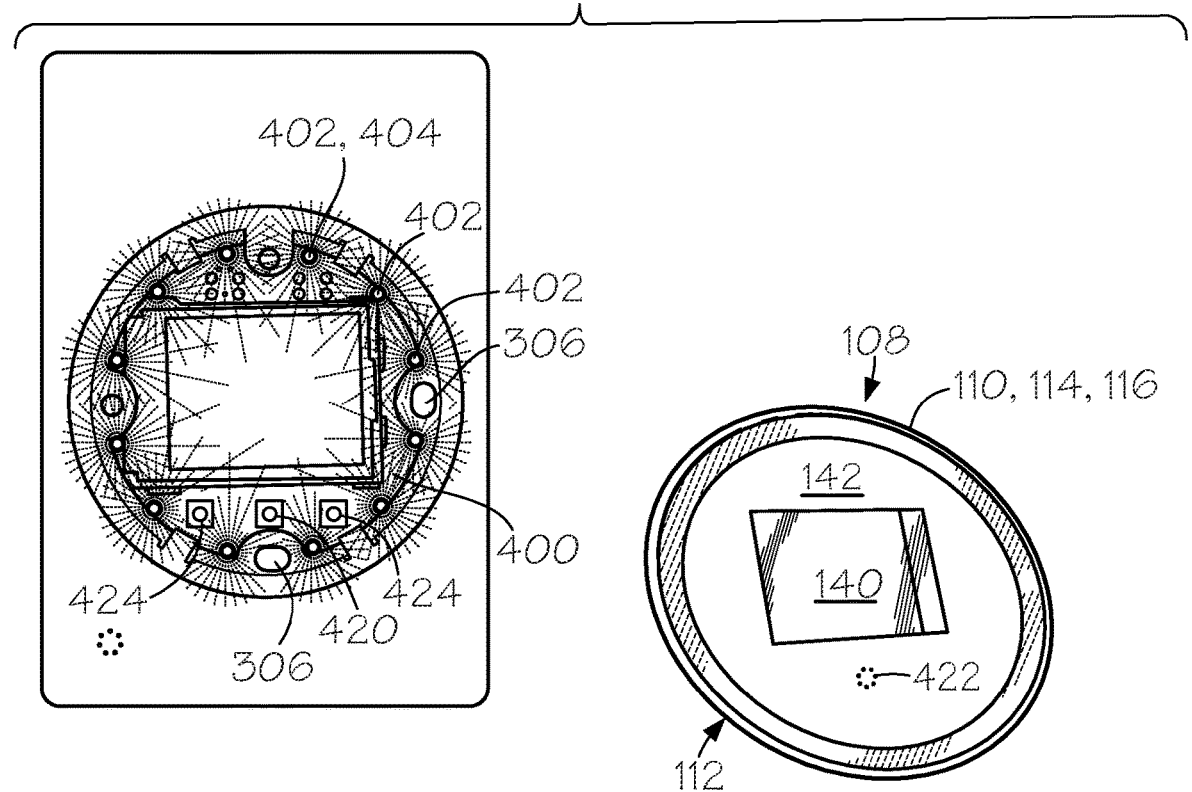
FIG. 4 is a front view of the pressure differential sensor apparatus of FIG. 1 with the face removed.

FIG. 4 is a front view of the pressure differential sensor apparatus 100 of FIG. 1 with the face 108 removed. A circuit board 400 is disposed on the housing 200 and is recessed from the face 108 of the faceplate 102 by a gap. One or more indicator lights 402 are likewise present. In the example embodiment shown, the one or more indicator lights 402 are mounted on the circuit board 400 and are configured to emit light into the light-transmissive perimeter 116. The one or more indicator lights 402 are further configured to emit the first color under the first pressure difference conditions and the second color under the second pressure difference conditions. Alternately, or in addition, the one or more indicator lights 402 may emit 3 or more colors and/or flash to convey the pertinent information. The light-transmissive perimeter 116 receives the light emitted from the one or more indicator lights 402 and in turn emits the light forward and laterally. In the example embodiment shown, the one or more indicator lights 402 form an array of indicator lights 404. In the embodiment shown, the array of indicator lights 404 matches a size and shape of the light-transmissive perimeter 116 to ensure optimal transmission of the most amount of light. The size and shape need not match exactly, nor at all. Moreover, while the light-transmissive perimeter 116 shown in this example embodiment is circular, any shape may be used. For example, the light-transmissive perimeter 116 may be oval, triangular, multisided (e.g. quadrilateral etc.), or even three-dimensional. An example three-dimensional shape includes a circular shape that also moves/undulates in and out of the page (as seen in FIG. 1). So long as the visual indicator 114 projects light forward and laterally, any shape is suitable.

In the example embodiment shown, the display 144 is mounted to the circuit board 400. A face-press sensor 420 is disposed behind the face 108 and interacts either directly with the face 108 or with a face feature 422 such that when the face 108 is pressed the face-press sensor 420 is likewise depressed. This causes the display 144 to momentarily display selected data. One or more menu buttons 424 may also be disposed behind the face 108. In the example embodiment shown, the one or more menu buttons 424 are mounted to the circuit board 400. In the example embodiment shown, the one or more menu buttons 424 can be activated only when the face 108 is removed. This prevents unintended adjustments to menu items resulting from simply depressing the face 108. The one or more menu buttons 424 can be used to program any and/or all aspects related to the pressure differential sensor apparatus 100. Example settings include alarm level, display always ON, display momentary ON, units of pressure, and alarm level delay (because the alarm can be unintentionally tripped by someone opening a door if there is no delay).

Figure 5:
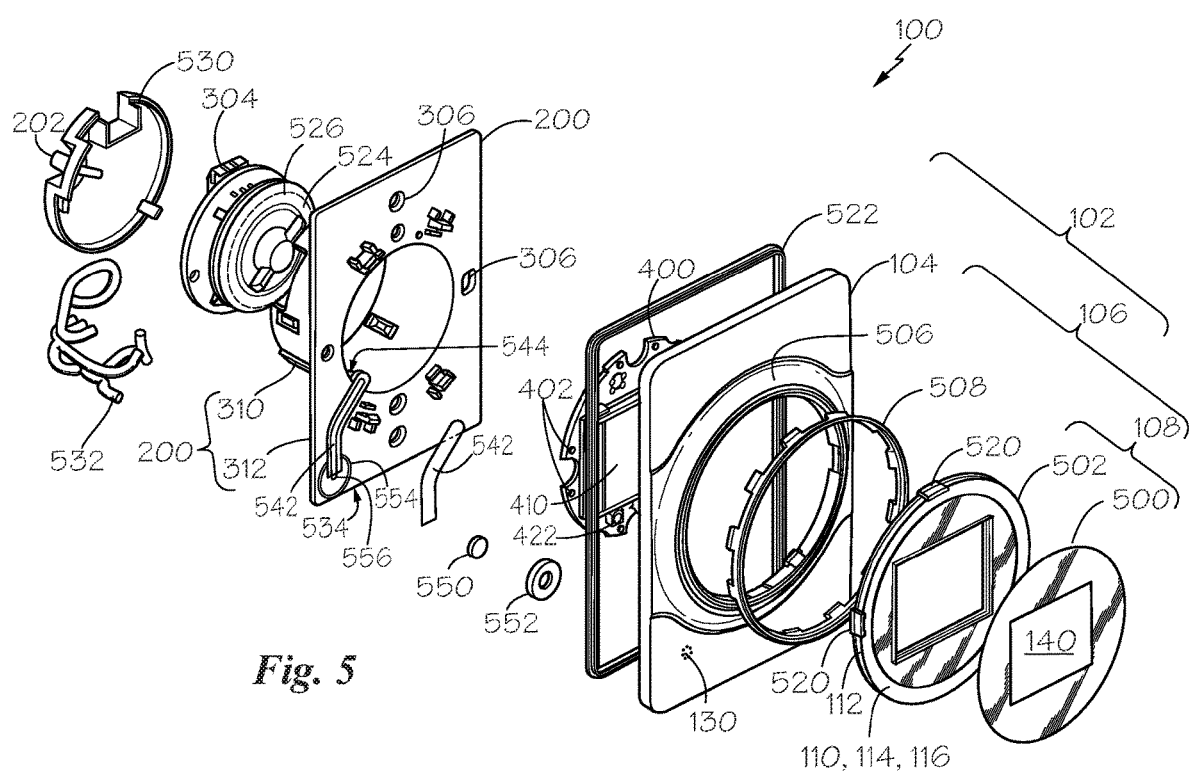
FIG. 5 is a perspective exploded view of the pressure differential sensor apparatus of FIG. 1.

FIG. 5 is a perspective exploded view of the pressure differential sensor apparatus 100 of FIG. 1. The face 108 may include a transparent cover 500 that may be coupled with a structural element 502. The base 104 may include a raised feature 506 that pushes the face 108 forward, away from a remainder of the base 104. An optional gasket ring 508 may be disposed between the raised feature 506 and the face 108. The structural element 502 of the face 108 may include one or more tabs 520 that engage with the base 104 of the faceplate 102. The tabs 520 retain the face 108 in position on the raised feature 506 but yield when the face 108 is pulled, thereby releasing the face 108 from the base 104. An optional gasket 522 may be disposed between the base 104 of the faceplate 102 and the back plate 312 of the housing 200. The circuit board 400 is disposed on the back plate 312 of the housing 200 and the pressure differential sensor 524 is disposed in the storage space 310. In an example embodiment, the pressure differential sensor 524 includes a stainless steel membrane 526. The housing 200 further comprises a housing cap 530 to enclose the storage space 310. The rear port 202 is integrated into the housing cap 530.

Internal fluid passageways establish appropriate fluid communication between the pressure differential sensor 524 and the front port 130 and the rear port 202. Included in the internal fluid passageways are conduit 532 and an innovative gutter arrangement 534. The gutter arrangement 534 includes a gutter 540 recessed into the housing 200 and a gutter seal 542 (e.g. Mylar® manufactured by Dupont Tejjin Films) disposed over the gutter 540. In the example embodiment shown, the gutter 540 is recessed at least into the back plate 312 and the gutter seal 542 is disposed over the gutter 540. This creates the gutter arrangement 534 which is sealed along its path and which can serve as part or all of the internal fluid passageways. In the embodiment shown, the gutter arrangement 534 acts as at least part of a fluid communication path between the pressure differential sensor 524 and the front port 130. A gutter port 544 may be positioned at an end of the gutter arrangement 534 and configured to engage a tube or other conduit such as conduit 532. Optionally, one or more filters 550, 552 may be provided to prevent contaminants from entering the pressure differential sensor 524. For example, the one or more of the filters 550, 552 may be positioned in a filter seat 554 so that the filters are disposed between the front port 130 and an entrance 556 of the gutter arrangement 534. This helps prevent contaminants that may enter the front port 130 from entering the gutter arrangement 534.

As has been disclosed above, the Inventors have developed a pressure differential sensor apparatus that is compact and easy to use. It can be configured to default to a simple display but retain the ability to convey complex pressure data upon request. The simplicity and ease of installation reduces costs associated with a pressure differential sensor apparatus. Consequently, the pressure differential sensor apparatus represents an improvement in the art.

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

The invention claimed is:

1. An apparatus, comprising:
   a pressure differential sensor configured to detect a pressure difference between two locations;
   a faceplate comprising a base and a protrusion from the base, the protrusion comprising a light-transmissive perimeter configured to transmit light forward and laterally; and
   a circuit board comprising an indicator light mounted thereon and configured to emit light into the light-transmissive perimeter, the indicator light further configured to emit a first color under first pressure difference conditions and a second color under second pressure difference conditions.

2. The apparatus of claim 1, wherein a face of the protrusion is depressible and comprises a transparent portion, the apparatus further comprising:
   a display disposed behind the transparent portion and positioned within the light transmissive perimeter; and
   a display sensor disposed behind the face and configured to be depressed when the face is pressed;
   wherein the display is configured to change what is displayed on the display in response to a depression of the face.

3. The apparatus of claim 2, wherein the display is configured to momentarily display a pressure difference value once the display sensor is depressed.

4. The apparatus of claim 2, wherein the face is removable, the apparatus further comprising a menu sensor disposed behind the face and configured not to be depressed when the face is pressed, wherein the menu sensor is accessible only when the face is removed, and wherein the menu sensor provides access to apparatus setting that are visible on the display.

5. The apparatus of claim 1, wherein a face of the protrusion comprises a transparent portion that aligns with the display, and an opaque portion between the transparent portion and the light-transmissive perimeter.

6. The apparatus of claim 1, further comprising a housing in which the pressure differential sensor is disposed, wherein the housing is configured to fit within a standard United States single gang box.

7. The apparatus of claim 1, wherein the pressure differential sensor comprises a pressure differential sensor comprising a stainless steel membrane.

8. The apparatus of claim 1, further comprising a housing to which the faceplate is secured, the housing comprising a gutter therein and a gutter seal over the gutter; and wherein fluid communicates between the pressure differential sensor and one location of the two locations via the gutter.

9. The apparatus of claim 1, further comprising an array of indicator lights comprising the indicator light, wherein the array of indicator lights forms a circle.

10. The apparatus of claim 1, wherein the first color indicates a minimum desired pressure difference is met and the second color indicates the minimum desired pressure difference is not met.

11. The apparatus of claim 1, wherein the light-transmissive perimeter comprises a translucent material.

12. An apparatus, comprising:
    a pressure differential sensor configured to detect a pressure difference between two locations;
    an indicator light configured to emit a first color under first pressure difference conditions and a second color under second pressure difference conditions;
    a faceplate set apart from the indicator light and comprising a base and a protrusion from the base, the protrusion comprising a light-transmissive portion configured to receive light emitted from the indicator light and to emit the light forward and laterally.

13. The apparatus of claim 12, further comprising a housing in which the pressure differential sensor is disposed, wherein the housing is configured to fit within a standard single gang box.

14. The apparatus of claim 12, further comprising a housing to which the faceplate is secured, the housing comprising a gutter and a gutter seal wherein fluid communicates between the pressure differential sensor and one location of the two locations via the gutter.

15. The apparatus of claim 12, wherein the light-transmissive portion comprises a translucent material around a perimeter of the protrusion.

16. The apparatus of claim 15, further comprising an array of indicator lights comprising the indicator light, wherein a shape of the array of indicator lights matches a 25 shape of the perimeter of the protrusion.

17. The apparatus of claim 12, wherein the protrusion comprises a perimeter comprising the light-transmissive portion and a transparent portion disposed within the perimeter, and wherein the apparatus further comprises a display mounted behind the transparent portion of the faceplate.

18. The apparatus of claim 17, wherein a face of the protrusion is depressible and comprises the transparent portion, the apparatus further comprising a display sensor disposed behind the face and configured to be depressed when the face is pressed, wherein the display is configured to change what is displayed on the display in response to a depression of the face.

19. The apparatus of claim 18, wherein the face is removable, the apparatus further comprising a menu sensor disposed behind the face and configured not to be depressed when the face is pressed, wherein the menu sensor is accessible only when the face is removed, and wherein the menu sensor provides access to apparatus setting that are visible on the display.

20. The apparatus of claim 12, wherein the first color indicates a minimum desired pressure difference is met and the second color indicates the minimum desired pressure difference is not met.

* * * * *